United States Patent [19]
Steinkamp

[11] Patent Number: 5,992,895
[45] Date of Patent: Nov. 30, 1999

[54] PLUG-IN COUPLING FOR CONNECTING TWO FLUID DUCTS

[75] Inventor: Christoph Steinkamp, Biebergemünd, Germany

[73] Assignee: Rasmussen GmbH, Maintal, Germany

[21] Appl. No.: 09/131,611

[22] Filed: Aug. 10, 1998

[30] Foreign Application Priority Data

Aug. 16, 1997 [DE] Germany .......................... 197 35 491

[51] Int. Cl.$^6$ ....................................................... F16L 11/12
[52] U.S. Cl. .......................... 285/45; 285/319; 285/423; 285/921
[58] Field of Search .............................. 285/45, 319, 423, 285/921, 315, 308

[56] References Cited

U.S. PATENT DOCUMENTS

| 4,573,716 | 3/1986 | Guest ..................................... 285/45 X |
| 4,895,396 | 1/1990 | Washizu ............................... 285/319 X |
| 5,112,086 | 5/1992 | Gruber et al. ....................... 285/319 X |
| 5,163,720 | 11/1992 | Abe ......................................... 285/319 |
| 5,167,431 | 12/1992 | Maifredi ................................ 285/319 |
| 5,284,369 | 2/1994 | Kitamura ............................. 285/319 X |
| 5,320,390 | 6/1994 | Kodama ................................ 285/319 X |
| 5,511,827 | 4/1996 | Steinkamp et al. . |
| 5,575,512 | 11/1996 | Umezawa . |

FOREIGN PATENT DOCUMENTS

2317212  1/1997  United Kingdom .

*Primary Examiner*—Dave W. Arola
*Attorney, Agent, or Firm*—Darby & Darby

[57] ABSTRACT

A plug-in coupling connects a first fluid duct to a second fluid duct. The first fluid duct has at least one retaining rib disposed on an outer peripheral surface thereof. The plug-in coupling includes a sleeve having a plurality of radial openings. Each of the radial openings has a front edge. The sleeve has an inner shoulder disposed on an inner peripheral surface thereof. A cylindrical locking device is received and is axially displaceable within the sleeve. The locking device has at least two axially extending, elastically flexible retaining arms depending from the locking device. A free end of each of the retaining arms is hook-shaped for selectively engaging the retaining rib when the first fluid duct is inserted into the locking device. Each of the free ends has a radially outwardly facing inclined face that abuts against the front edge of one of the radial openings in the sleeve when the sleeve and the locking device are axially displaced away from each other thereby increasing the engagement force applied by the hook-shaped free end to the retaining rib. Each of the free ends has a radially inwardly facing inclined face that is disposed adjacent to the retaining rib when the first fluid duct is inserted in the locking device. The locking device has at least two release arms depending therefrom. One of the release arms is disposed between two of the retaining arms. Each of the release arms projects radially outwardly through one of the radial openings in the sleeve. Each of the release arms is axially displaceable with respect to the sleeve. A plurality of axially extending ribs are disposed on an inside peripheral surface of the sleeve. At least one sealing ring is disposed between the inner shoulder of the sleeve and the locking device. Each of the axially extending ribs is disposed between one of the retaining arms and one of the release arms of the locking device. Each of the ribs is disposed adjacent to the retaining rib when the first fluid duct is inserted into the locking device.

8 Claims, 5 Drawing Sheets

PLUG-IN COUPLING FOR CONNECTING TWO FLUID DUCTS

BACKGROUND OF THE INVENTION

1. Field of the Invention

The present invention relates to a plug-in coupling for connecting two fluid ducts.

More specifically, the present invention relates to a plug-in coupling for connecting a first fluid duct to a second fluid duct, where the first fluid duct has at least one retaining rib. The plug-in coupling includes a sleeve, which has radial openings. A cylindrical locking device is axially guided for displacement within the sleeve. The locking device has axially extending and elastically flexible retaining arms with a hook formed at the free end of the arms for engaging behind the retaining rib of the first fluid duct when the first fluid duct is axially introduced into the locking device. The arms have at their free ends a radially outwardly inclined face, which, when the sleeve and the locking device are moved axially apart, presses against a front edge of one of the radial openings in the sleeve. Thus, the hook more firmly engages with the retaining rib when the locking device and sleeve move axially away from each other. The arms also have at their free ends a radially inwardly facing inclined face that contacts the retaining rib when the locking device and sleeve move axially away from each other. The locking device has a release arm disposed between each of the retaining arms. The release arm projects radially outwardly, in an axially displaceable manner, through one of the radial openings in the sleeve. At least one sealing ring is disposed between an inner shoulder of the sleeve and the locking device.

2. Discussion of the Related Art

A plug-in coupling is disclosed by German Reference DE 44 13 346 C1. All of the components of this plug-in coupling and of the first fluid duct, which is usually a pipe socket that is to be inserted into the coupling, have dimensional tolerances. Thus, when the first fluid duct is inserted into the plug-in coupling, the first fluid duct can be deflected laterally, to a relatively large extent, with respect to the plug-in coupling (e.g., as a result of vibration in a motor vehicle). This is especially true if the surfaces in contact have the maximum permissible dimensional tolerance deviation. These lateral deflections result in an increased load being placed on the sealing ring, and, in extreme cases, leakage. If the fluid ducts and coupling members are used for the conveyance of combustible fluids, such as, fuel (e.g., gasoline), oil or gases, the fluid duct and coupling members must also have the maximum level of electrical conducting capacity to prevent an electrostatic charge from causing a spark, which could cause a fire. If the members do not fit each other exactly, a relatively high transition resistance could occur, which hinders the shunting off of electrostatic charges across these members.

SUMMARY OF THE INVENTION

Accordingly, it is an object of the present invention to provide a plug-in coupling that essentially prevents lateral deflection of a fluid duct that is inserted into the plug-in coupling. It is a further object of the present invention to provide a plug-in coupling that reduces transition resistance between the various parts to shunt off electrostatic charges between the plug-in coupling and the fluid duct.

According to a preferred embodiment of the present invention, this object is achieved by using a sleeve that has a plurality of axially extending ribs disposed on the inner peripheral surface. Each rib is aligned between the retaining arms and the release arms of the locking device and is disposed adjacent to the retaining rib of the first fluid duct when the first duct is introduced through an insertion opening in the sleeve and, therefore, into the locking device.

The axial extending ribs essentially prevent lateral deflection of the first fluid duct when it is inserted into the plug-in coupling because the first fluid duct is more closely supported at the insertion opening of the sleeve due to the relatively close location of the retaining rib with respect to the axially extending ribs. The load on the sealing ring in the plug-in coupling in accordance with the present invention is considerably smaller than the load on the sealing rings in known plug-in couplings. Therefore, the sealing ring will have a longer service life. The sealing capacity is retained even in the presence of high transverse forces, particularly at temperatures as low as −40° C. The axial ribs also provide improved guidance when inserting the first fluid duct into the plug-in coupling. Because of the axial ribs, the first fluid duct cannot be inserted into the plug-in coupling in an inclined position, thereby striking against the end face of a retaining arm, as could occur with known plug-in couplings. Further, the operator will not be given the false impression that the coupling operation has been completed, despite the fact that no locking has yet taken place. The axial ribs also reinforce the sleeve. Thus, the force required to withdraw the first fluid duct from the plug-in coupling increases as a result. In other words, the connection can withstand greater axial loads than known plug-in couplings. The position of the retaining rib adjacent to the axial ribs produces a larger contact surface and, therefore, a smaller transition resistance, so that electrostatic charges are shunted off more efficiently.

The release arms preferably extend axially and are elastically flexible. Like the retaining arms, the release arms have free ends that are hook-shaped. The release arms, therefore, additionally serve as retaining arms. Thus, the release arms increase the contact surface with the retaining rib via their hook-shaped free ends.

The release arms each project radially outwardly through a radial opening in the sleeve. The release arms also have a spring arm that extends axially away from the insertion opening of the sleeve. The spring arm is radially outwardly profiled and has a first projection that projects radially inwardly. When the locking device is moved axially away from the insertion opening in the sleeve, for example, by drawing the retaining and release arms back towards the rear edge of the radial openings, the first projection engages axially behind a second projection on the outside of the sleeve. To release the first fluid duct from the locking device, the spring arms are pressed against the sleeve so that the locking device is fixed with respect to the sleeve. The hook-shaped free ends of the release arms and of the retaining arms permit the retaining rib of the first duct to move forward axially (i.e., toward the sleeve insertion opening). The spring arms can be easily held by the operator's thumb and index finger so that the locking device can be pulled towards the rear edges of the openings. The retaining arms and the release arms, including their respective hook-shaped free ends, radially straddle the inserted first fluid duct. But, the hooks are free to move radially outwardly in this rearward axial position so that the first duct may be withdrawn from the locking device. When the spring arms are pressed together radially by the thumb and index finger, the first projections on the spring arms engage axially behind the respective projections of the sleeve to fixedly connect the locking device to the sleeve.

The first fluid duct preferably has a peripheral collar, which has axial grooves to receive the axial ribs of the sleeve. Because the radial inner surface of the axial ribs are positioned adjacent to the bottom of the grooves, the collar provides additional support against lateral deflection of the inserted first fluid duct. In addition, because the axial ribs of the sleeve engage into the grooves of the collar, twisting of the connection, which may be caused by torsion, is prevented.

Furthermore, when the first fluid duct is inserted into the locking device, the collar substantially completely occupies the intermediate space between the first fluid duct and the sleeve in the insertion opening thereof. Thus, the collar further supports the inserted first fluid duct against lateral deflection. Additionally, the collar essentially closes the insertion opening of the sleeve, thereby preventing dirt or flames from entering into the sleeve.

A protective covering can be placed over the sleeve's radial openings. The protective covering thereby also prevents dirt and/or flames from entering into the sleeve through the radial openings.

The protective covering is preferably made of an elastic material, such as, for example, rubber, to permit easy assembly and disassembly.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PREFERRED EMBODIMENT

Figure 1:
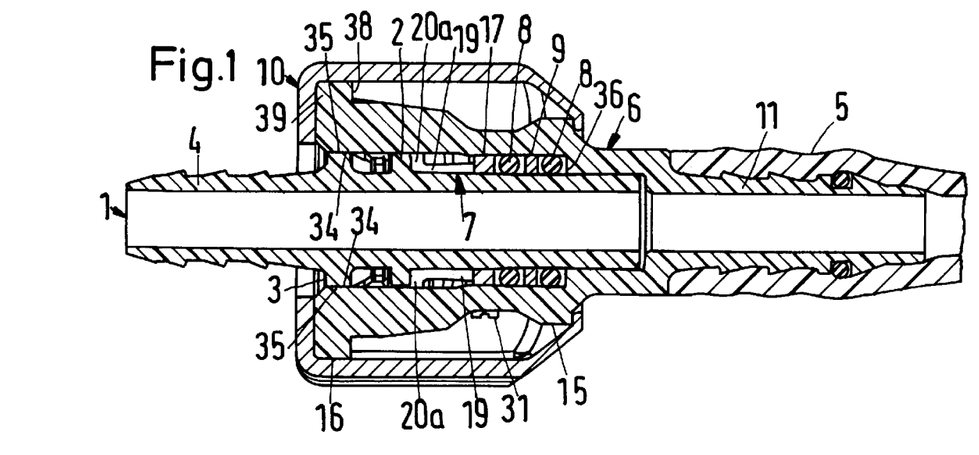
FIG. 1 is a cross-sectional view, taken along line I—I of FIG. 2, of the plug-in coupling according to the present invention, with a first fluid duct in the form of a pipe socket having a retaining rib being inserted into the plug-in coupling and with a second fluid duct placed firmly onto the opposite end of the plug-in coupling.
Figure 2:
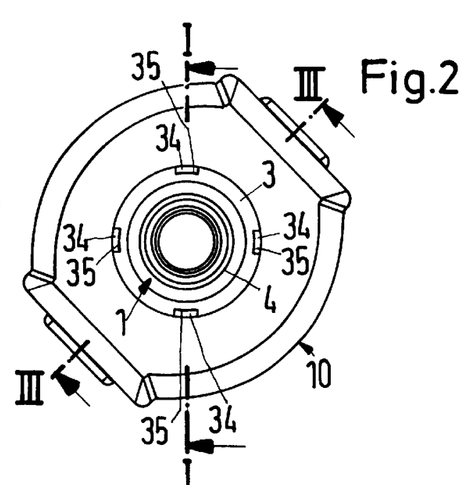
FIG. 2 is a left side view of the plug-in coupling shown in FIG. 1.

Referring now to FIGS. 1 and 2, a plug-in coupling, which is used to connect a first fluid duct 1 to a second fluid duct 6, is illustrated. Fluid duct 1 is typically made of a plastic or metal material and is in the form of a pipe socket and has an outer peripheral retaining rib 2, a collar 3 and a ribbed end portion 4. Fluid duct 5 is typically made of a plastic material and is in the form of a tube.

The plug-in coupling includes a cylindrical sleeve 6, a locking device 7, two sealing rings 8, a spacer ring 9 disposed between the sealing rings and a protective covering 10. Cylindrical sleeve 6 and locking device 7 are preferably made of a plastic material. If any one of the first fluid duct 1, second fluid duct 5, cylindrical sleeve 6 and locking device 7 is made of a plastic material, the plastic material preferably contains electrically conductive additives (e.g., carbon particles or carbon fibers), which not only increase the strength of the plastic material, but also increases their electrical conducting capacity to shunt off electrostatic charges.

Second fluid duct 5 sits, subject to its own elastic force, firmly on a ribbed end portion 11 of sleeve 6. Fluid duct 5 can, alternatively or additionally, be firmly clamped to ribbed end portion 11 with a hose clamp. The other axial end portion of sleeve 6 has four radial openings 12 and 13 distributed uniformly over its periphery (See FIGS. 12–16 and 18). Openings 12, 13 have a rectangular shape and extend in the longitudinal or axial direction of sleeve 6. The internal diameter of the axial end portion of sleeve 6 that has openings 12, 13 is greater than the internal diameter of the adjacent portion of sleeve 6 that receives rings 8 and 9. The internal diameter of the portion of sleeve 6 adjacent to end portion 11 is approximately equal to the external diameter of first fluid duct 1 (see FIGS. 1 and 2), whereas the internal diameter of end portion 11 is approximately equal to the internal diameter of first fluid duct 1.

Figure 10:
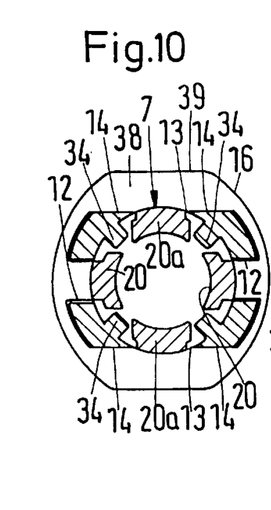
FIG. 10 is a cross-sectional view taken along line X—X of FIG. 9.
Figure 11:
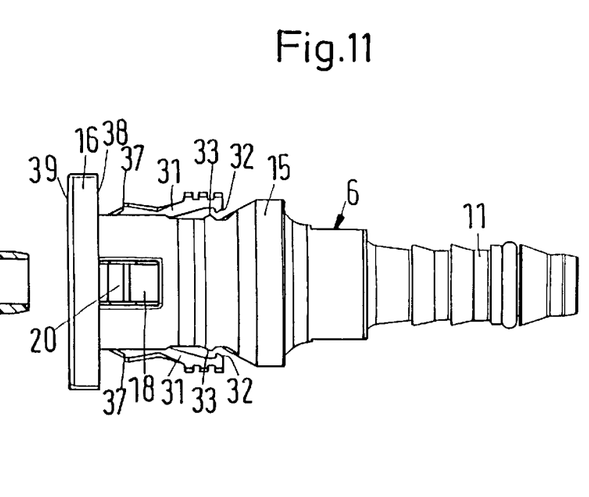
FIG. 11 is a plan view of the plug-in coupling, in a position which has been rotated through 90° about its longitudinal axis relative to FIG. 8.
Figure 12:
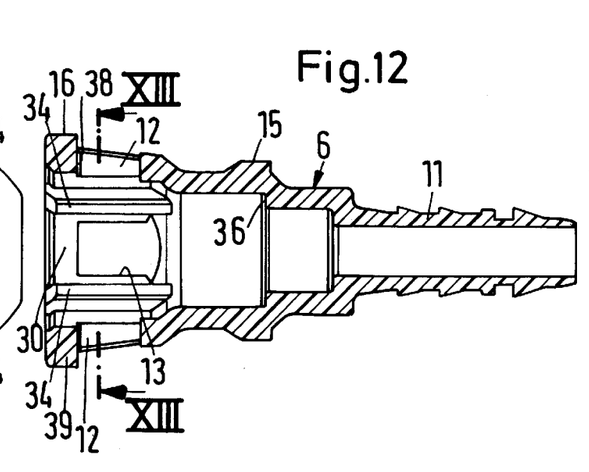
FIG. 12 is a cross-sectional view of the sleeve of the plug-in coupling, in a position which has been rotated through 90° about its longitudinal axis relative to FIG. 9.
Figure 13:
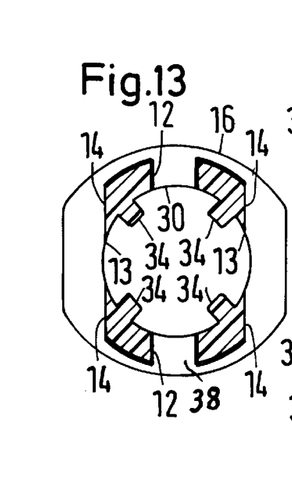
FIG. 13 is a cross-sectional view taken along line XIII—XIII of FIG. 12.
Figure 14:
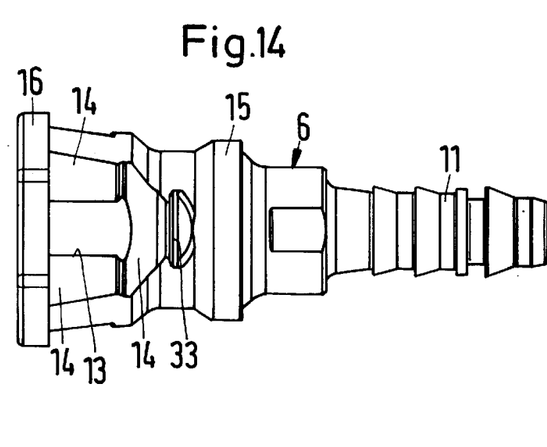
FIG. 14 is plan view of the sleeve in the same position of angular rotation as in FIG. 12.
Figure 15:
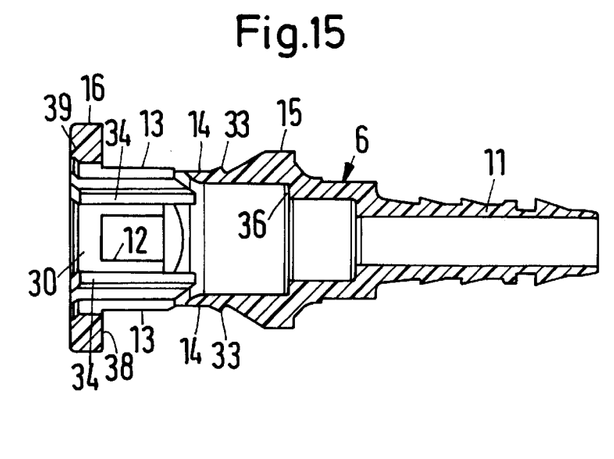
FIG. 15 is an cross-sectional view of the sleeve, in a position which is rotated through 90° about its longitudinal axis relative to FIG. 12.
Figure 16:
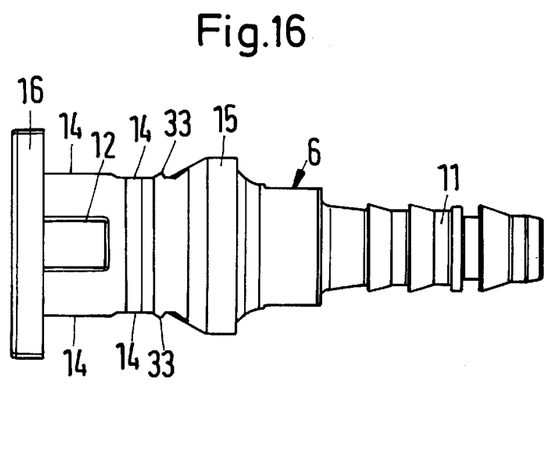
FIG. 16 is a plan view of the sleeve, in a position which is rotated through 90° about its longitudinal axis relative to FIG. 14.
Figures 17, 18:
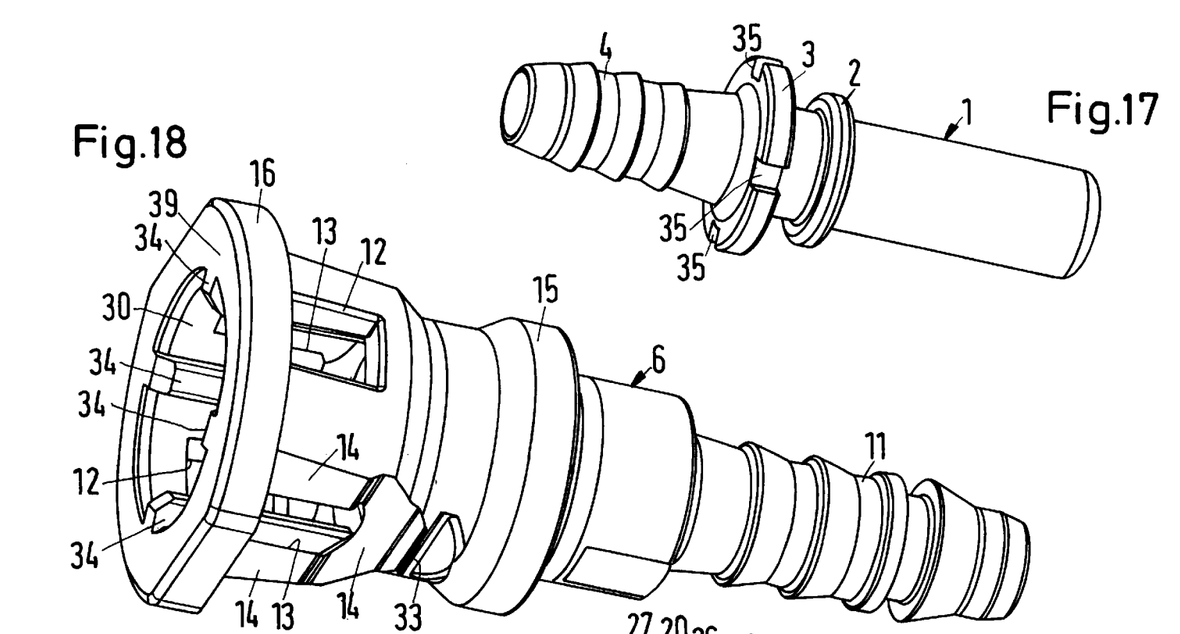
FIG. 17 is a perspective view of a fluid duct, which is insertable into the plug-in coupling.
FIG. 18 is a perspective view of the sleeve of the plug-in coupling.
Figure 19:
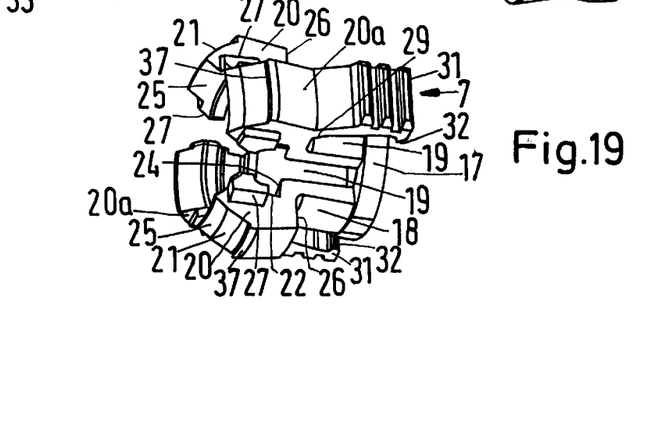
FIG. 19 is a perspective view of a locking device of the plug-in coupling.

As shown more clearly in FIGS. 13, 14, 16 and 18, an offset flattened region 14 is disposed on the outer peripheral surface of sleeve 6 next to each opening 13. Each flattened region 14 extends transversely with respect to the longitudinal axis of sleeve 6. Outer cylindrical surfaces 15 and 16 are disposed on both axial sides of openings 12, 13. Outer cylindrical surfaces 15 and 16 have different diameters. More specifically, the diameter of surface 16 adjacent to the end of the sleeve 6 is greater than the diameter of surface 15. Outer cylindrical surface 16 has two flattened regions that are disposed diametrically opposite one another (See FIGS. 10, 13 and 18).

Referring now to FIGS. 3–11 and 19, locking device 7 includes a closed ring 17 having two elastically flexible retaining arms 18 and two elastically flexible release arms 19 formed on ring 17. The retaining arms 18 (see FIGS. 7 and 19) each have a hook 20 disposed at their free end for engaging behind the retaining rib 2 when first fluid duct 1 is inserted axially into the locking device 7. A radially outwardly facing inclined face 21 is disposed at the free ends of the hooks 20. A recess 22 is disposed on the radially inwardly facing side of hook 20. Recess 22 is delimited on one axial side by a radially inwardly facing, inclined face 23, which has a substantially convex shape. Recess 22 is delimited on its opposite axial inner side by a radial surface 24. Recess 22 is sized so that it receives the retaining rib 2 in a clearance-free manner independent of the tolerance of the width of the axial retaining rib 2. In addition, each hook 20 has a radially inwardly facing inclined surface 25 at its free end and a radially extending contact surface 26 remote from the axial front end for positioning on a rear edge of opening 12 to restrict the axial movement of the locking device 7 in the rearward direction (i.e., away from the insertion opening). A lateral projection 27 is disposed on each hook 20 close to the front end thereof for abutting the inside of sleeve 6. The radial inner surface 28 of each retaining arm 18 and the radial inner surface of each release arm 19 has a partial cylindrical shape, whose diameter corresponds to the external diameter of the first fluid duct 1 in the adjacent region.

The release arms 19 are disposed between the retaining arms 18. The release arms 19 are distributed at equal angular spacings over the periphery of the cylindrical locking device 7. Thus, the retaining arms 18 are located diametrically opposite one another with respect to the longitudinal axis of the sleeve 6 and the locking device 7. Likewise, the release arms are located diametrically opposite one another with respect to the longitudinal axis of the sleeve and the locking device. The release arms 19, like the retaining arms 18, have hooks 20a, which have the same shape as the hooks 20 of the retaining arms 18. But, whereas the radial outer parts of the hooks 20 project into and are axially displaceable in openings 12, hooks 20a of the release arms 19 project through openings 13 and extend radially outwardly across the flattened regions 14. The radial outer portion of hooks 20a is also displaceable within the opening 13. Like the retaining arms 18, the release arms 19 are elastically flexible, and each one also has a contact surface 29 for positioning on a rear edge of the respective opening 13 to restrict the pushing in (i.e., insertion) of the locking device 7 within sleeve 6. Like the retaining arms 18, the release arms 19 are elastically flexible, and each one also has a spring arm 31, which extends rearwardly in the axial direction with respect to the insertion opening 30 of sleeve 6. Spring arms 31 are profiled radially on their outer peripheral surface by transversely extending ribs to enable the spring arms 31 to be held securely by the thumb and index finger of one hand.

To release the first fluid duct 1, the locking device 7 is pulled back axially so that surfaces 26 and 29 are adjacent to the rear edge of openings 12 or 13, as shown in FIGS. 3, 6, 7 and 11. The spring arms 31 are then pressed radially inwardly so that the projections 32 engage behind further projections 33 on the outer peripheral surface of sleeve 6 (see FIGS. 6, 9, 11, 14 to 16 and 18).

Axially extending ribs 34 are disposed on the inside peripheral surface of sleeve 6. Ribs 34 abut a relatively large portion of the surface area of retaining rib 2 of the fluid duct 1 when duct 1 is inserted into the locking device 7 and sleeve 6 through the insertion opening 30 in sleeve 6. Each of the ribs 34 extends between a retaining arm 18 and a release arm 19 and through an axial groove 35 in collar 3 of first fluid line 1. The external diameter of collar 3 is approximately equal to the diameter of the insertion opening 30 of sleeve 6, so that if the first fluid duct 1 is inserted into the locking device 7 and sleeve 6, according to FIGS. 1 and 2, collar 3 together with ribs 34 occupies an intermediate space between the first fluid duct 1 and the insertion opening 30 to produce a relatively tight seal, thereby preventing penetration of dirt or flames inside the sleeve.

Figure 3:
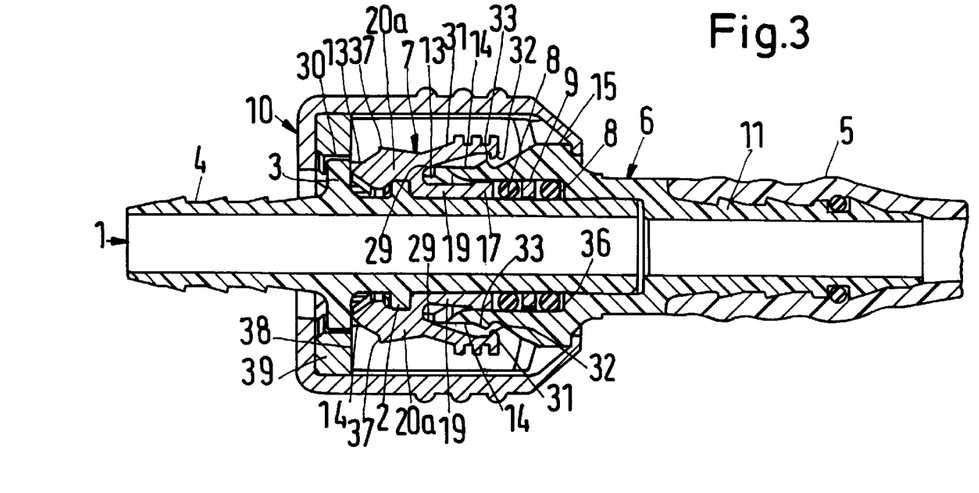
FIG. 3 is a cross-sectional view taken along the line III—III of FIG. 2, which is rotated through 45° relative to the axial section of FIG. 1.
Figure 4:
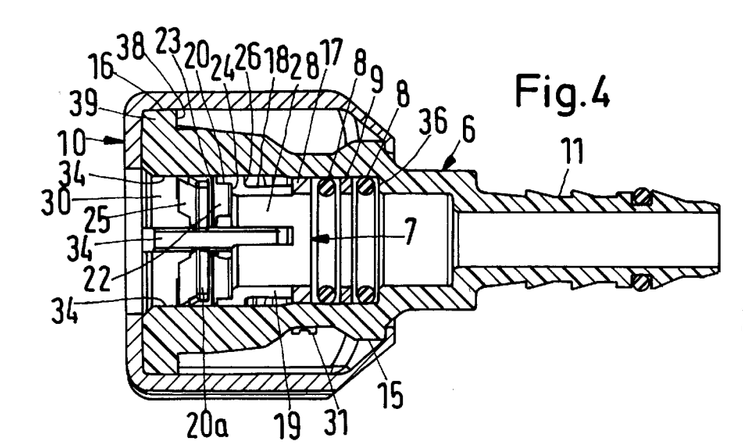
FIG. 4 is a cross-sectional view along the line IV—IV of FIG. 5, and without the fluid ducts shown in FIG. 1.
Figure 5:
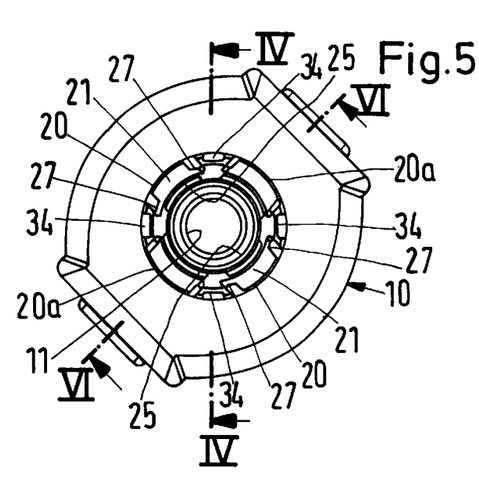
FIG. 5 is a left side view of the plug-in coupling of FIG. 4.
Figure 6:
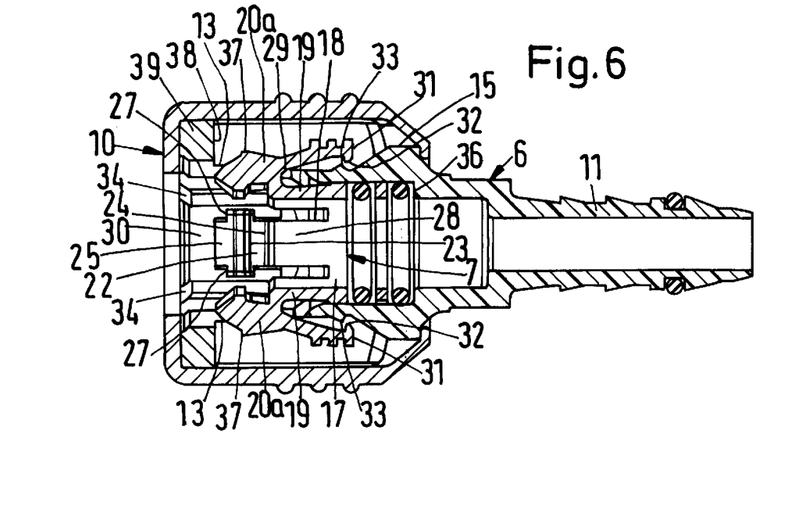
FIG. 6 is a cross-sectional view taken along line VI—VI of FIG. 5.
Figure 7:
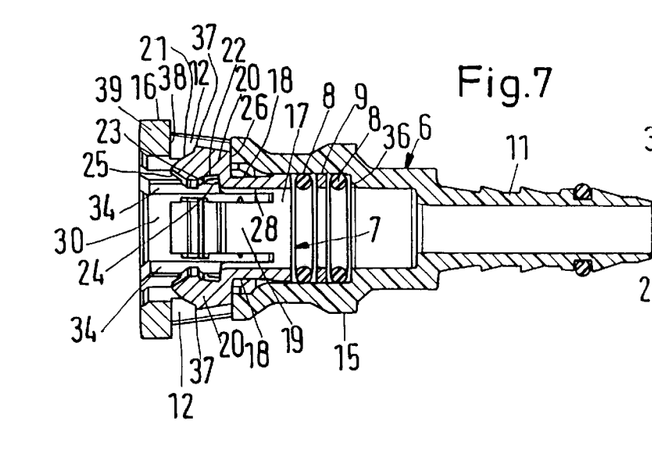
FIG. 7 is an axial cross-sectional view taken through the plug-in coupling without the protective covering, in a position which is rotated through 90° about is longitudinal axis relative to FIG. 6.
Figure 8:
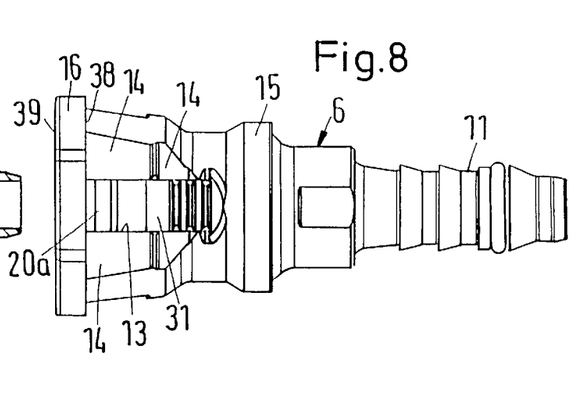
FIG. 8 is a plan view of the plug-in coupling shown in FIG. 7.
Figure 9:
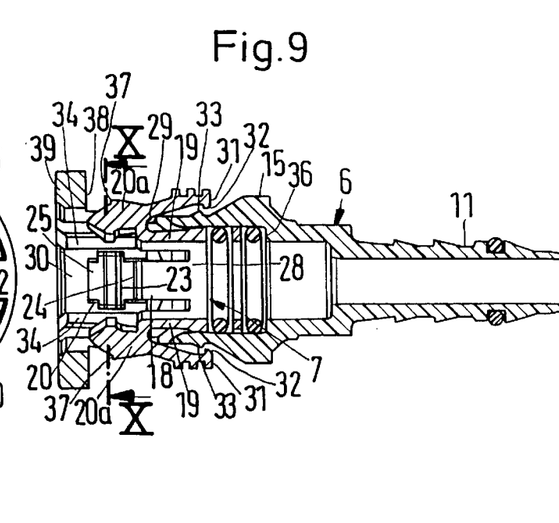
FIG. 9 is the same axial cross-sectional view as that shown in FIG. 6, but without the protective covering.

To connect the fluid ducts 1 and 5, before the protective covering 10 is put on, the plug-in coupling is connected to second fluid duct 5. The plug-in coupling is then connected to the first fluid duct 1, as shown in FIG. 1. As first fluid duct 1 is inserted into the insertion opening 30, the retaining rib 2 presses against the inclined surfaces 25 of the hooks 20 and the corresponding inclined surfaces of the hooks 20a. Continued insertion of first fluid duct 1, causes rib 2 to engage the inclined surfaces of the hooks 20, 20a, thereby causing the entire locking device 7 to move axially into the sleeve 6 far enough so that the contact surfaces 26 and 29 of the retaining arms 18 and the release arms 19, respectively, abut the rear edge of the openings 12, 13, respectively, as shown in FIGS. 3, 6 and 7. In this position, the sealing rings 8 become encased between an inner shoulder 36 of sleeve 6 and the closed ring 17 of the locking device 7, without the sealing rings 8 being deformed.

Further insertion of the fluid duct 1 into the plug-in coupling causes the hooks 20 and 20a of the retaining arms 18 and release arms 19, respectively, to move radially outwardly until the retaining rib 2 is received in recess 22, at which point the arms 18, 19 spring back (i.e., move radially inwardly) into the position shown in FIGS. 1 and 3. The elastic protective covering 10, which has been expanded beforehand, may then be pushed back over the sleeve 6. Alternatively, the protective covering 10 could be pushed over sleeve 6 before the coupling operation. A tubing can be fixed to the ribbed end portion 4 in a similar manner as tube 5 is fixed to end portion 11. However, it is also possible, to design the end portion 4 as a tube without ribs, or to design the fluid duct 1 as a pipe socket that is provided with a further retaining rib 2 (e.g., such as the pipe socket that conventionally projects from a radiator of a motor vehicle).

In the position shown in FIGS. 1 and 3, the fluid ducts 1 and 5 are connected together in a seal-tight manner. The fluid duct 1 is laterally guided in several places and is supported radially in sleeve 6, by ring 17 of the locking device 7, by the retaining arms 18 and the release arms 19, but, above all, by ribs 34, which contact retaining rib 2 and the bottom of the grooves 35, and also by the collar 3 contacting the inner surface of the insertion opening 30. The retaining and release arms 18, 19 laterally support the first fluid duct 1 by their partial cylindrical inner surfaces contacting the outer periphery of the retaining rib 2. The connection can, therefore, withstand strong radial forces without any radial deflection of the plug-in coupling relative to the first fluid duct 1. Furthermore, because there is a relatively large contact surface between the first fluid duct and the plug-in coupling, smaller transition resistances result between the first fluid duct 1, sleeve 6 and locking device 7 to provide better shunting off of electrostatic charges, which is particularly advantageous if a combustible fluid is flowing through the ducts. The protective covering 10 prevents the penetration of dirt into the sleeve 6 and also offers protection against penetration by flames for a certain amount of time.

If a high pressure develops in the fluid ducts 1 and 5 when coupled, as shown in FIGS. 1 and 3, the axial components of the pressure will cause the sleeve 6 and the fluid duct 1 to move axially apart. However, during this axial movement, the inclined surfaces 21 of the retaining arms 18 and the corresponding inclined surfaces of the release arms 19 abut on the inner front edge of the openings 12 and 13, respectively, thereby causing the hooks 20 and 20a to be pressed even more firmly against the retaining rib 2. Additionally, radially outwardly extending projections 37, which have a radial end face and project from hooks 20, 20a, additionally abut against the radially inner side 38 of ring 39 that projects radially inwardly from the insertion end of sleeve 6. Thus, a forceful decoupling of the connection is prevented, even in the event of an excessive axial load being placed on the connection.

To separate or disconnect the connection between the fluid ducts 1 and 5, protective covering 10 is first removed. Then, the spring arms 31 of the release arms 19 of locking device 7, which project over the periphery of the flattened region 14 are grasped by the thumb and index finger of one hand. The locking device 7 is then axially pulled back into the position shown in FIGS. 1–3. The spring arms 31 are then pressed together radially so that projections 32 engage behind projections 33. The plug-in coupling as a whole can then be decoupled from the fluid duct 1 by pulling the plug-in coupling away from the first fluid duct. During this movement, retaining rib 2 presses against inclined face 23 of recess 22, thereby causing retaining arms 18 and release arms 19 to move radially outwardly until rib 2 is located forward of inclined surface 25 of the hooks 20 and the corresponding inclined surface of hooks 20a. The hooks 20, 20a will then spring back into their relaxed position. During this decoupling movement, projections 32 and 33 facilitate holding of the locking device 7 fixed with respect to sleeve 6.

It is also possible to leave the protective covering 10 on the sleeve 6 during decoupling. If necessary, fluid duct 1 and the plug-in coupling are first pushed together axially far enough so that the contact surfaces 26, 29 of the retaining and release arms 18, 19, respectively abut the rear edge of the openings 12, 13. The elastic protective covering 10 is then pressed in radially in the region of the spring arms 31 so that projections 32 engage behind the projections 33 in sleeve 6 to more securely hold the locking device 7 during decoupling. The retaining rib 2 of first duct 1 is now disengaged from the hooks 20, 20a in the same manner as described above.

The regions of the protective covering 10 that have to pressed in for decoupling are flattened and are provided with a corrugated configuration in the form of ribs so that the protective covering 10 can be more easily held during decoupling and so that the user is able to determine which regions he or she has to press to accomplish the decoupling. The flattened regions of the protective covering 10 correspond to flattened regions on the periphery of ring 39 to facilitate the correct positioning of the protective covering 10 during attachment.

Having described the presently preferred exemplary embodiment of a plug-in coupling for connecting two fluid ducts in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A plug-in coupling for connecting a first fluid duct to a second fluid duct, wherein said first fluid duct has at least one retaining rib disposed on an outer peripheral surface thereof, said plug-in coupling comprising:

a sleeve having a plurality of radial openings, each of said radial openings having a front edge, said sleeve having an inner shoulder formed on an inner peripheral surface thereof;

a cylindrical locking device being received and axially displaceable within said sleeve, said locking device having at least two axially extending, elastically flexible retaining arms depending from said locking device, a free end of each of said retaining arms being hook-shaped for selectively engaging said retaining rib when said first fluid duct is inserted into said locking device, each of said free ends having a radially outwardly facing inclined face that abuts against said front edge of one of said radial openings in said sleeve when said sleeve and said locking device are axially displaced away from each other thereby increasing the engagement force applied by said hook-shaped free end to said retaining rib, each of said free ends having a radially inwardly facing inclined face that is disposed adjacent to said retaining rib when said first fluid duct is inserted in said locking device; said locking device having at least two release arms depending therefrom, one of said release arms being disposed between two of said retaining arms, each of said release arms projecting radially outwardly through one of said radial openings in said sleeve, each of said release arms being axially displaceable with respect to said sleeve; a plurality of axially extending ribs disposed on an inside peripheral surface of said sleeve;

at least one sealing ring being disposed between said inner shoulder of said sleeve and said locking device; and wherein each of said axially extending ribs is disposed between one of said retaining arms and one of said release arms of said locking device, and each of said ribs is disposed adjacent to said retaining rib when said first fluid duct is inserted into said locking device.

2. The plug-in coupling according to claim 1, wherein said release arms extend axially and are elastically flexible, a free end of each of said release arms being hook-shaped for selectively engaging said retaining rib when said first fluid duct is inserted into said locking device, each of said free ends having a radially outwardly facing inclined face that abuts against said front edge of one of said radial openings in said sleeve when said sleeve and said locking device are axially displaced away from each other thereby increasing the engagement force applied by said hook-shaped free end to said retaining rib, each of said free ends having a radially inwardly facing inclined face that is disposed adjacent to said retaining rib when said first fluid duct is inserted into said locking device.

3. The plug-in coupling according to claim 2, wherein said hook-shaped free ends of said release arms each project radially outwardly through one of said radial openings, each of said release arms having a spring arm that extends axially away from an insertion opening of said sleeve, said spring arm being radially outwardly profiled and having a first projection projecting radially inwardly, when said retaining arms and said release arms are axially displaced away from said insertion opening towards a rear edge of the radial openings, said first projection engages behind a second projection disposed on the outside of said sleeve when said spring arms are pressed against said sleeve to permit said first fluid duct to be decoupled from said locking device.

4. The plug-in coupling according to claim 1, wherein said first fluid duct has a peripheral collar that has axial grooves for receiving the axially extending ribs disposed on said sleeve.

5. The plug-in coupling according to claim 4, wherein when said first fluid duct is inserted into said locking device, said collar occupies an intermediate space between said first fluid duct and said sleeve in said insertion opening of said sleeve.

6. The plug-in coupling according to claim 1, further comprising a protective covering being placed over said sleeve to cover said radial openings, said retaining arms and said release arms.

7. The plug-in coupling according to claim 6, wherein said protective covering is made of an elastic material.

8. The plug-in coupling according to claim 7, wherein said covering is made of rubber.

* * * * *